United States Patent [19]

Tulet

[11] Patent Number: 5,302,816
[45] Date of Patent: Apr. 12, 1994

[54] OPTICAL DEVICE FOR DETERMINING THE RELATIVE POSITION OF TWO VEHICLES, AND AN ALIGNMENT SYSTEM COMPRISING AN APPLICATION THEREOF

[75] Inventor: Michel Tulet, Balma, France
[73] Assignee: Matra Marconi Space France, France
[21] Appl. No.: 937,849
[22] PCT Filed: Feb. 11, 1992
[86] PCT No.: PCT/FR92/00122
 § 371 Date: Oct. 9, 1992
 § 102(e) Date: Oct. 9, 1992
[87] PCT Pub. No.: WO87/02797
 PCT Pub. Date: May 7, 1987
[30] Foreign Application Priority Data
 Feb. 12, 1991 [FR] France .................. 90 01608
[51] Int. Cl.⁵ .................................. H01J 40/14
[52] U.S. Cl. .......................... 250/206.2; 244/161
[58] Field of Search ................. 250/206.2, 216; 244/161; 414/730; 901/47; 358/107; 356/4, 141, 152

[56] References Cited

U.S. PATENT DOCUMENTS 4,709,580 12/1987 Butts, Jr. .
4,753,569 6/1988 Pryor .................... 250/206.2
5,109,345 4/1992 Dabney et al. ........... 244/161
5,119,305 6/1992 Ferro ....................... 244/161

FOREIGN PATENT DOCUMENTS 254634 1/1988 European Pat. Off. .
8702797 5/1987 PCT Int'l Appl. .

OTHER PUBLICATIONS

Sensor and Actuators, vol. 17, No. 3/4, May 17, 1989, pp. 329-338.
NTIS Technical Notes, Nov. 1, 1989, Springfield, Va. US p. 956 "Alignment system for docking control".

Primary Examiner—David C. Nelms
Assistant Examiner—K. Shami
Attorney, Agent, or Firm—Larson and Taylor

[57] ABSTRACT

The device for determining the relative attitude and range of a chaser vehicle and of a target vehicle comprises, on the chaser, a camera for forming the image of a field of view of determined angular extent and, on the target, a set of several markers. The spacing between the markers is such that they are at least partially outside the angular field of view of the camera carried by the chaser when the range between the chaser and the target is less than a determined value, and the target (11) carries reflector means (16) which remain entirely within the field of view, even at ranges less than said value, and which provide images of the markers (14) in the field of the camera.

8 Claims, 5 Drawing Sheets

OPTICAL DEVICE FOR DETERMINING THE RELATIVE POSITION OF TWO VEHICLES, AND AN ALIGNMENT SYSTEM COMPRISING AN APPLICATION THEREOF

BACKGROUND OF THE INVENTION

The method relates to an optical device for determining the relative position of two vehicles, one of which carries an active installation and is referred to below as the "chaser" while the other one is referred to below as the "target" and carries markers that are passive during such determination. A particularly important, but non-exclusive application of the invention lies in the field of measuring the distance, the position, and/or the orientation of the target relative to the chaser, in particular for enabling two spacecraft to rendezvous and dock.

A device is already known (EP-A-0 254 634) that enables the relative attitude and distance between a chaser and a target to be determined, said device comprising, on the chaser, a camera for forming an image of a field of view having determined angular extent, and on the target, a set of several markers spaced apart in such a manner that they are all contained in the angular field when the distance between the chaser and the target is large and the field of the camera is properly centered relative to the target.

Such a measurement device in which the markers are generally constituted by reflectors distributed in a determined geometrical pattern and illuminated by a source of light pulses carried by the chaser, can be used for determining the distance between the chaser and the target by measuring the go-and-return time of the light, and it enables the attitude of the target relative to the chaser to be determined at relatively short range by comparing the image obtained with the known pattern in which the markers are distributed.

It becomes extremely difficult to measure relative attitude and misalignment when the distance between the chaser and the target is less than a threshold. There are two reasons for this. Firstly, the focusing of the image on the detector (which is generally constituted by a camera having a matrix of sensors) is degraded when the distance between the chaser and the target becomes small. In addition, below the threshold, the angular separation between the markers tends to exceed the angular field of the detector.

By way of example, FIG. 1 shows the field of view of a detector that can be considered as being representative, the field extending over an angle of 10° in one direction and 13.3° in the other direction. A pattern constituted by reflectors disposed at the corners and at the center of a square-based pyramid having a base of side 10 cm appears in the field in the manner shown in FIG. 1 when the range is 1 meter. At a range of less than 0.3 m, it is no longer possible to keep all of the markers in the field, even when there is no aiming error.

Another problem is constituted by the impossibility of giving the camera an optical system that retains focusing from infinity down to very short range. In practise, the loss of focus when the range between the detector and the target drops below 50 cm, causes the image provided by the camera to have a spot whose diameter is large in number of pixels. For a camera having a matrix made up of charge coupled devices (CCD) of the type conventionally used, and using the parameters mentioned above, the out-of-focus spot has a diameter of 9 pixels at a range of 50 cm.

The idea that comes to mind for avoiding the above problems consists in providing a plurality of patterns on the target each constituted by retroreflectors of a diameter that is optimized to take account of diffraction and of the angular field that corresponds to a single pixel. For example, this leads to a plurality of patterns being provided having the following unit diameters:

50 cm for ranges of 100 m to 1 km;
12 cm for ranges of 10 m to 200 m;
1.2 cm for ranges of 2 m to 20 m; and
5 mm for ranges of 0.5 m to 4 m.

Nonetheless, that technique does nothing to solve the problem of loss of focus which makes useful measurement impossible, in practice, at ranges of less than about 50 cm. Calculating the center of gravity of a spot caused by loss of focus becomes very difficult.

SUMMARY OF THE INVENTION

The invention seeks, in particular, to achieve satisfactory operation of the optical device at ranges between the chaser and the target that are smaller than the ranges acceptable with present devices.

To this end, the invention provides a device characterized in that the markers are spaced apart in such a manner as to cause at least some of them to lie outside the angular field of view of the camera carried by the chaser once the distance between the chaser and the target is less than a determined value, and in that the target carries reflector means which remain completely within the field of view even below said determined distance value, and which provide an image of the markers within the field of view of the camera.

This disposition makes it possible to ensure that the real or physical distance between the camera and the markers remains large even when the target and the chaser are very close together, while simultaneously making it possible for the camera to have a small angular field.

In practice, the reflector means are generally constituted by a reflecting pyramid placed in the center of the pattern and having three or four faces, depending on the number of markers. The markers are generally retroreflectors, such as the corners of a cube, placed at a distance from the pyramid that is advantageously not less than 50 cm.

It can thus be seen that the problem of loss of focus is thus eliminated since the light paths between the camera and the markers are always longer than the distances between the reflector means and the markers. In addition, the device of the invention makes it possible to give the pattern a shape that complies with the shape of the target: the reflecting faces of the pyramid can be adjusted so as to match the positions available for installing markers on the target.

In another aspect of the invention, it seeks to solve a problem that is specific to space vehicles having docking ports in their central portions that are suitable for coupling together. Until now, ports have been aligned relative to each other by using a determination device whose markers are distributed in a pattern placed on board the target. Such a disposition gives rise to large errors: an alignment error of 0.2° and a maximum off-centering of 2 m give rise to a positioning error in the center of the docking port of 7 mm along each axis. Furthermore, possible differential expansion also gives rise to significant alignment errors.

To avoid this problem, the invention proposes a system including two devices of the type defined above, and offset angularly about the axis of the port.

The invention will be better understood on reading the following description of particular embodiments given as nonlimiting examples.

Figure 2:
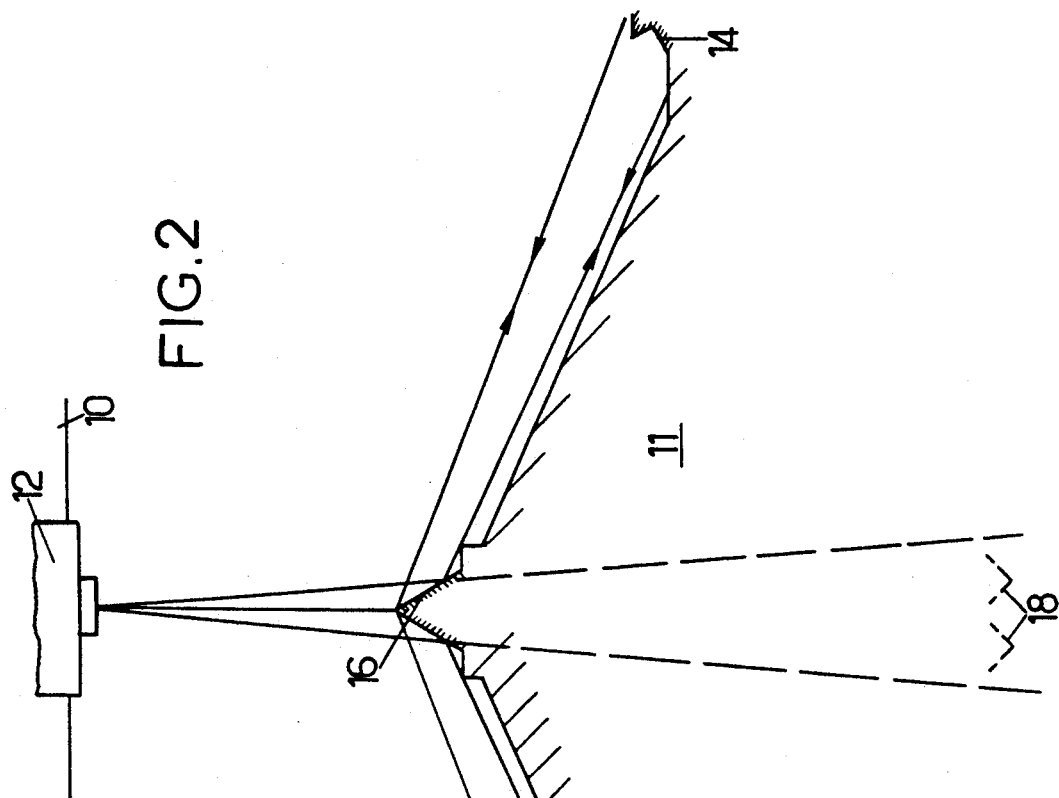
FIG. 2 is a diagram showing the relative disposition of reflector means and of markers on the target in a device of the invention.
Figure 1:
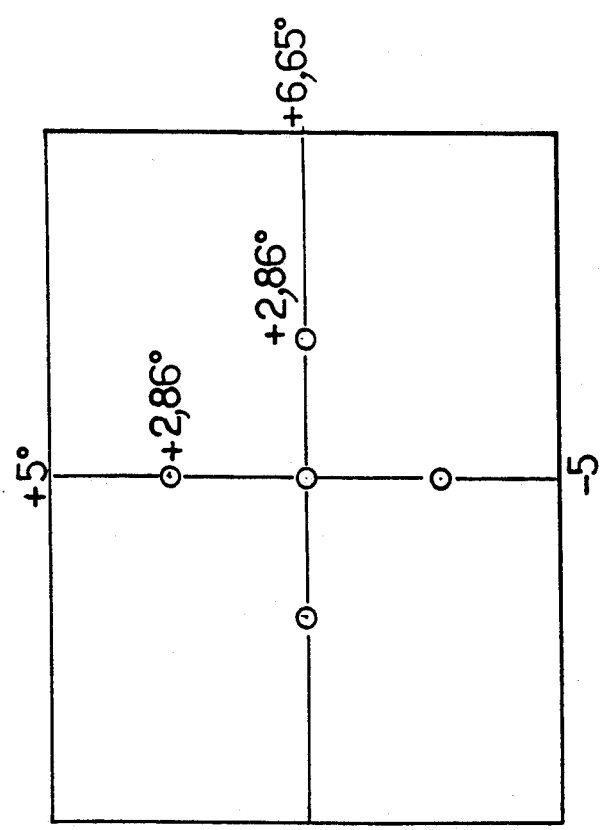
FIG. 1, as mentioned above, shows the field of view of a representative detector and the image of a determined square-based pattern at a range of 1 m.

In a device of the invention having the theoretical disposition shown in FIG. 2, the chaser 20 still carries a camera 12 such as a CCD camera which is provided with a coaxial illumination device (not shown). The target 11 carries markers 14 constituted by retroreflector cube corners disposed in a determined pattern, often the four corners of a square. The target 11 also carries reflector means 16 shown as being in the form of a pyramid having reflecting faces disposed so that when the camera 12 is centered relative to the pattern, the images of the markers 14 are centered in the field of the camera, as shown at 18 in FIG. 2.

The reflector means 16 may be considered as constituting a spreader for the illuminating beam and as a collector for the beams returned by the markers, enabling a virtual target to be defined having a narrow base (e.g. 1 cm so as to make it possible to use a minimum distance between the camera and the target of about 10 cm) while nevertheless avoiding excessive loss of focus.

Figure 3:
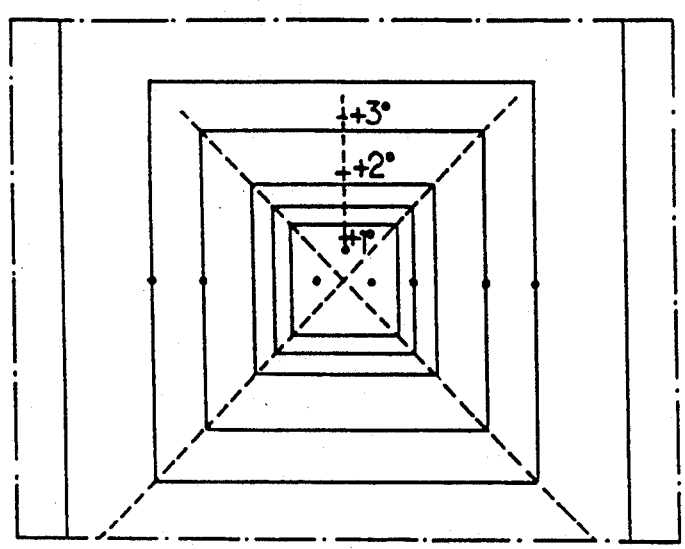
FIG. 3 shows how the measurement domain varies in several embodiments as a function of the distance between the camera and the pattern on the target (with the apex of the pattern being taken as the reference)
Figure 4:
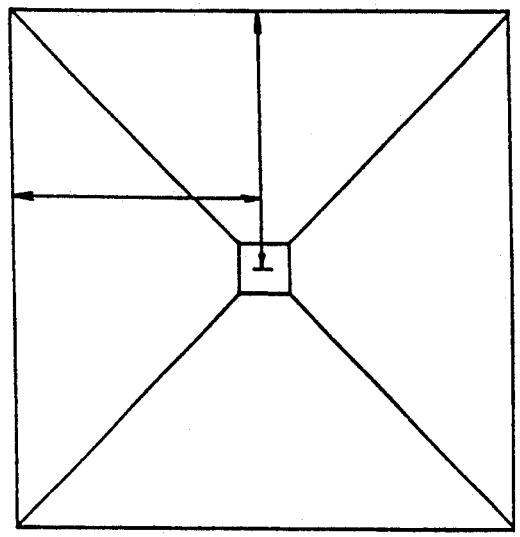
FIG. 4 shows how illumination is distributed for reflector means constituted by a square-based pyramid.

By way of example, FIG. 3 shows the illumination and measuring domain as a function of range from the camera to the center of the pattern of markers (which range is used as the reference), for the case of a beam splitter formed by a pyramid having the dimensions shown in FIG. 4 and placed so that the pattern has a virtual base of side 1 cm. The distances "d=" give ranges.

Figure 5:
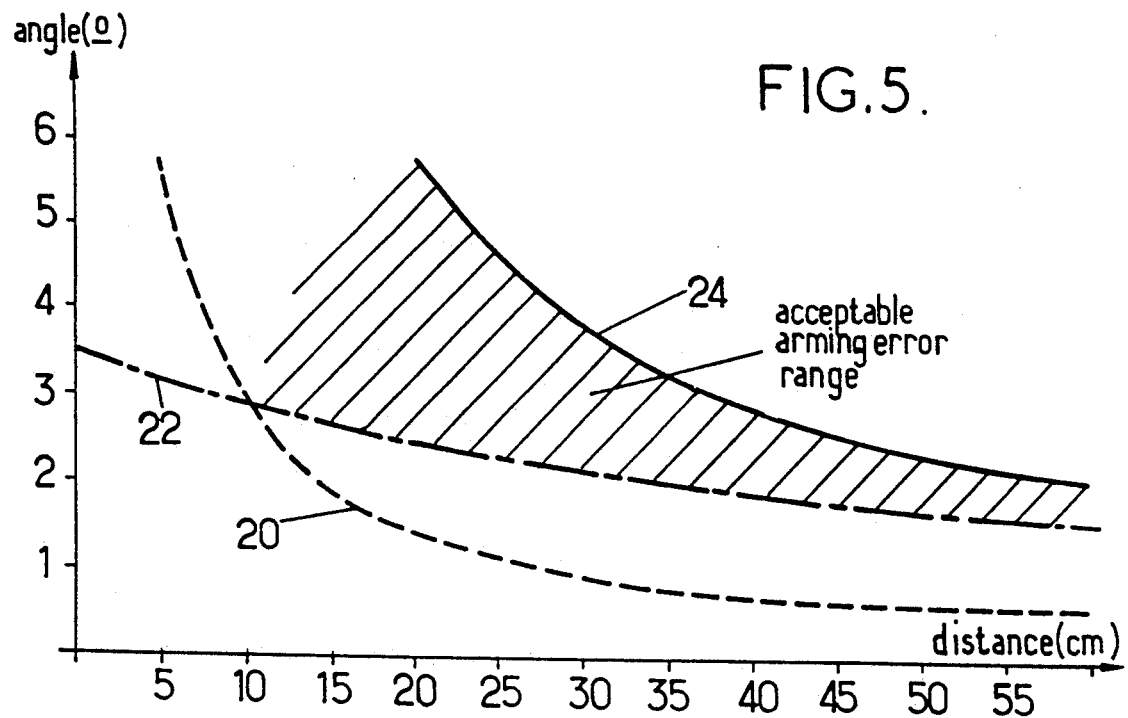
FIG. 5 is a graph having curves that show the acceptable aiming error as a function of range for a particular base width in a beam-spreading pyramid that constitutes the reflector means.

The advantage of the invention can be seen in FIG. 5. Dashed line curve 20 in said figure shows the measurement angle of a conventional device for a pattern having a base equal to 0.5 cm and for a range of up to 60 cm. For the same camera, dot-dashed line curve 22 shows the angle measured by a device having a 6 cm base and set back by 50 cm by using a beam spreader. Finally, solid line curve 24 shows the maximum aiming error that can be accepted in this case, when the beam spreader is constituted by a pyramid having a base of size 6 cm. It can be seen that the device of the invention makes it possible accept aiming error which even at 50 cm remains greater than 0.6° and which increases as range decreases. It can also be seen that it is possible to use markers constituted by the corners of a cube of large size, of size greater than the case represented by curve 20, thereby facilitating measurement.

Curves similar to the curves 22 and 24 can be drawn for other parameters, e.g. for a virtual target having a base of size 2 cm, again moved away by 50 cm, and a beam spreader constituted by a pyramid having a base of size 2 cm, which likewise makes it possible for an aiming error that is still greater than 0.6° to be accepted at ranges of 10 cm to 50 cm.

Figure 6:
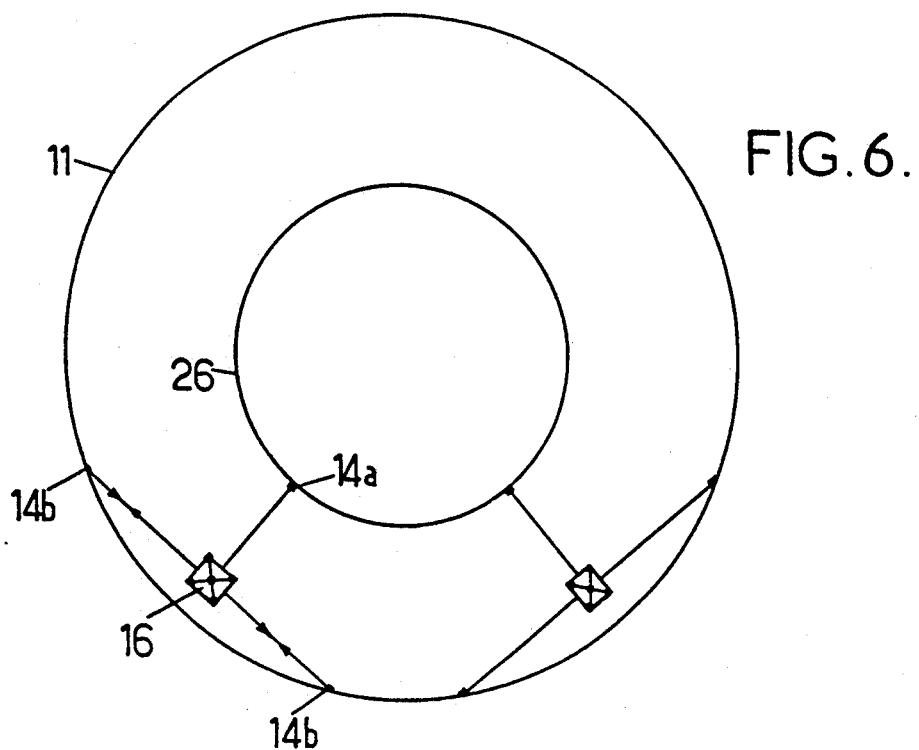
FIG. 6 is a diagram showing one possible way of installing two patterns and reflector means on a target provided with a docking port.

As mentioned above, the invention is particularly suitable for use on a chaser vehicle and a target vehicle provided with docking ports that are to be brought into coincidence. As shown in FIG. 6, a port 26 generally lies on the axis of the vehicle. Under such circumstances, an advantageous solution consists in providing two distinct optical devices having the same structure. Each includes a camera placed on the chaser and a set of markers and reflector means placed on the target. The two devices are offset from each other about the axis of the target vehicle (usually by 90°), which axis is to be brought into alignment with the axis of the chaser vehicle during docking, and each device may comprise three markers in the disposition shown in FIG. 6. In FIG. 6, the central marker 14a is placed on the edge of the docking port 26 and the other two markers 14b are placed on the edge of the target vehicle. The reflector means 16 are constituted by respective pyramids having reflecting faces situated at equal distances from the three markers, halfway between the markers 14b.

Other configurations are possible, using three markers or four markers per device.

The use of a device that makes it possible to obtain a large measurement base solves the problem of loss of focus and the problem of limited angular field. When it is necessary to measure alignment errors between the camera and the reflector means accurately, it is advantageous to use the disposition described below, one embodiment of which is shown diagrammatically in FIG. 7.

The device, or each device, then includes in addition to the markers 14 (represented merely by points in FIG. 7) and the reflector means 16, an additional optical assembly constituted so that its image is superposed on the image of the markers 16 carried by the target vehicle when alignment is achieved. Additional markers 30 that are close enough together to be directly in the field of the camera beyond a determined range may also be provided on the target. For example, they may be formed by retroreflectors mounted at the top and at the base angles of the pyramid constituting the reflector means.

Figure 7:
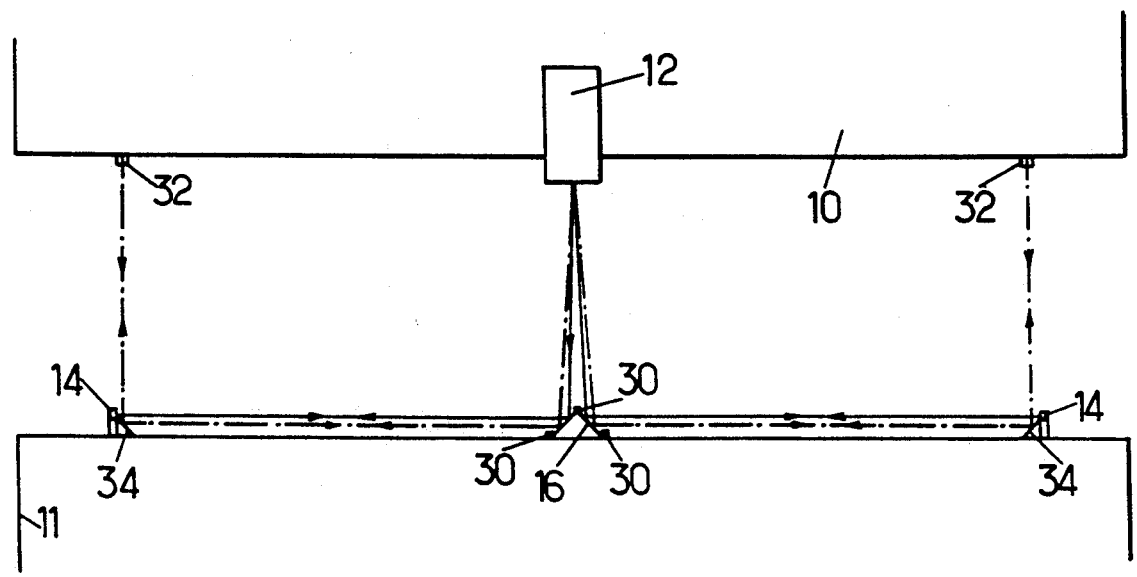
FIG. 7 is a theoretical diagram showing a device enabling the differential attitude of a chaser and a target to be determined when they are close to each other.

In the case shown in FIG. 7, the additional assembly comprises auxiliary markers 32 mounted on the chaser vehicle in a distribution pattern that reproduces the pattern of the markers 14. Mirrors 34 each associated with a corresponding one of the markers 14 are provided to reflect a portion of the illuminating beam towards the chaser and to return the image of the corresponding auxiliary marker 13 towards the camera 12. Each of the auxiliary markers 32 may be constituted by the corner of a cube, like the markers 14.

It is thus easy to monitor the alignment of the target and of the chaser, and to measure the amplitude and the direction of any misalignment that may occur. The images of the markers 14 and the images of the markers 32 are superposed on the camera, both of which images constitute a large-base pattern which is thus suitable for accurate measurement. Conventional distance-measuring circuits may be associated with the camera 12 for associating alignment errors and rotational positioning errors on the basis of the differences between the images of the markers 14 and the images of the auxiliary markers 32.

Depending on whether it is desired only to be able to measure short distances between the chaser and the target, or whether on the contrary it is desired to be able to measure range and alignment over a greater distance, the reflector means 16 and the mirrors 34 are made small in size or large in size.

Figure 8:
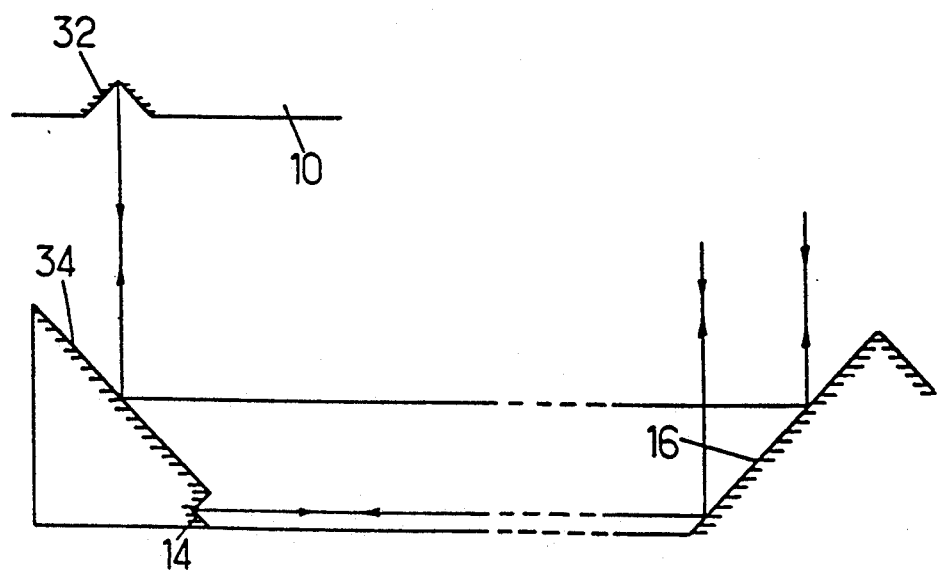
FIG. 8 is a diagram showing a detail of the FIG. 7 device.

Optimum dimensions as a function of the desired result can be determined by simple calculation. FIG. 8 shows one possible disposition corresponding to a large range of distance measurements, leading to the mirror 34 being considerably greater in size than the marker 14.

Figure 9:
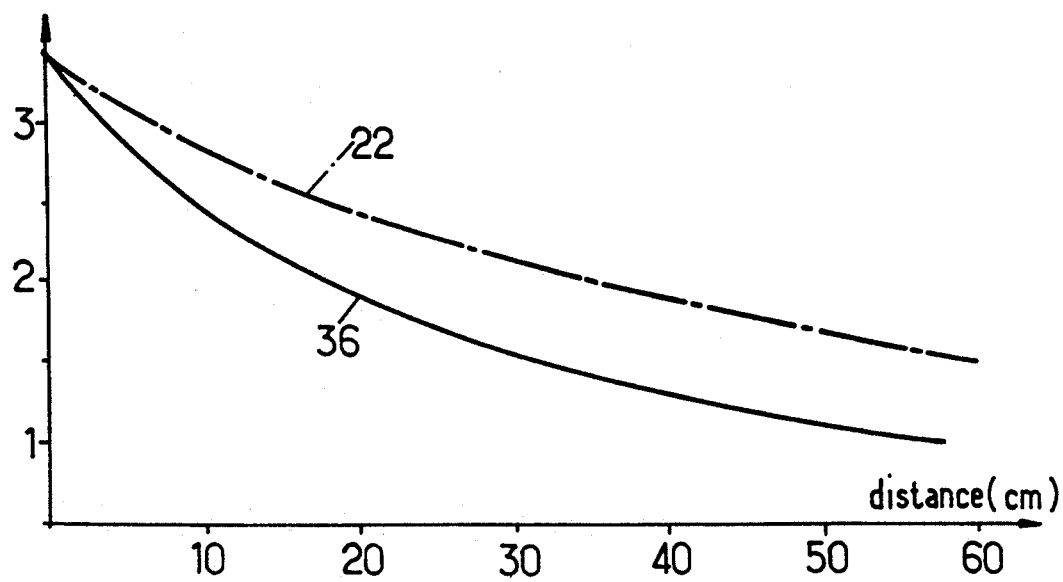
FIG. 9 is a graph showing how the viewing angle of patterns carried by the target and the chaser vary in the device of FIG. 7 as a function of distance.

As an indication, FIG. 9 applies to a base having the same size as that which corresponds to curve 22 in FIG. 5, and shows how the angle between the markers 14 of the target (dashed curved 22) and between the markers 32 on the chaser (solid line curve 36) appear to vary as a function of range in the absence of any aiming error.

Figure 10:
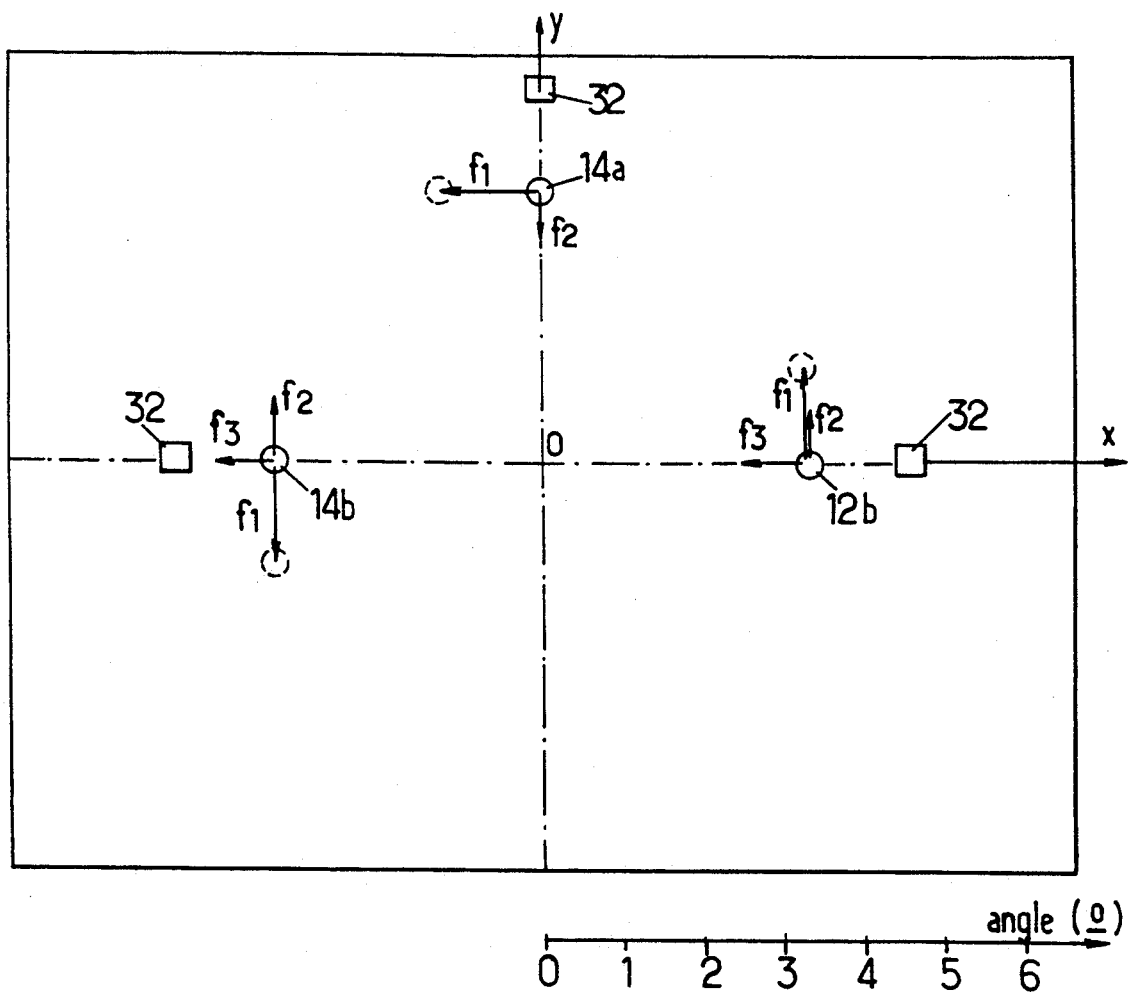
FIG. 10 is a diagram showing an example of the image of the markers in the field of the camera.

FIG. 10 shows an example of the appearance of the image provided by the camera 12 when the chaser and the target are in alignment and when they are at the reference rotational position relative to each other. In the figure, the spots corresponding to markers 14 and 32 are designated by those reference numbers and they are respectively shown as being circles and squares.

In order to enable the distance-measuring circuits to distinguish the markers of the chaser from the markers of the target, the markers may be designed to give different images or they may include periodic occultation means enabling them to be identified.

The image of FIG. 10 corresponds to a field of 10° by 13.3° and to the above-mentioned distances between markers, and the range between the camera and the center of the pattern constituted by the markers is 10 cm. The distances between the markers 14 and the markers 32 make it possible to measure the range, and also the aiming error and the relative rotational error (by comparing the spots corresponding to the markers 14 with the spots corresponding to the markers 32).

For example, if the spots representing the markers 14 occupy the positions shown in dashed lines in FIG. 10, i.e. if they are offset from centered positions by vectors f1 of the same amplitude and each orthogonal to the line passing through the center 0, then there is a relative rotation error about the common optical axis of the camera and of the patterns.

Mutually parallel offsets f2 with that of 14a being in the opposite direction represent an alignment error due to tilting about an axis parallel to Ox.

Displacements of the kind represented by arrows f3 indicate an alignment error in the orthogonal direction.

By measuring these errors and by using formulae that take account of the positions of the markers on the target and on the chaser, it is possible to determine exactly the relative position of the chaser relative to the target.

It can be seen that the device of the invention makes it possible, merely by adding means that are very simple since they are limited to a few markers and to reflectors, to locate the target very accurately down to very short ranges, thereby solving docking problems.

I claim:

1. A device for determining the relative position of a chaser vehicle and of a target vehicle, said device comprising:
   a camera located on a chaser vehicle for forming an image of a direct field of view of predetermined angular extent;
   a set of a plurality of markers carried by a target vehicle, located at spacings selected to enable them to be contained in said direct field of view as long as a distance between the chaser vehicle and the target vehicle is greater than a predetermined value and the camera is centered relative to the target, but such that at least some of said markers lie outside the direct field of view of the camera when the range between the chaser and the target is less than said predetermined value; and
   reflector means carried by said target vehicle which remain entirely within said direct field of view, even below said predetermined value, and which provide images of said markers in said direct field of view of said camera.

2. A device according to claim 1, wherein said reflector means comprise a pyramid placed at substantially equal distances from said markers and having a same number of reflecting faces as there are markers.

3. A device according to claim 1, wherein said markers are constituted by retroreflectors.

4. A device according to claim 1 for further determining a relative attitude of said chaser vehicle and target vehicle further including, on said target vehicle, a plurality of mirrors situated substantially at the same locations as said markers and providing an image, in the field of view of the camera, of auxiliary markers placed on the chaser vehicle.

5. A device according to claim 4, wherein said markers on the target vehicle are placed at a base of said mirrors.

6. A system for determining the relative attitude and the mutual distance of a space chaser vehicle and a space target vehicle, each having a respective axis and each provided with a respective axial docking port, said system comprising a first device and a second device, each said device having:
   a camera located on the chaser vehicle, having a field of view with an axis parallel to the axis of the chaser vehicle and at a distance therefrom, the axes of the cameras of the first and second device being mutually angularly spaced around the axis of said space chaser vehicle,
   a set of a plurality of markers located at such spacings that they are contained in the angular field of view of the respective camera when the distance between the chaser vehicle and the target vehicle is greater than a predetermined value and the camera is directed towards the set but that at least some of said markers lie outside the field of view of the respective camera when the range between the chaser vehicle and the target vehicle is lesser than said predetermined value, and a plurality of reflector means carried by said target vehicle which remain entirely within said field of view when the distance between said chaser vehicle and target vehicle is lower than said predetermined value and greater than a second predetermined value smaller than the first and which provide images of said markers in the field of the respective camera.

7. A system according to claim 6, wherein said devices each comprise a central marker placed on an edge of the docking port of a target vehicle and a plurality of additional markers placed on the target vehicle at locations on said target vehicle which are farthest from the axis of the target vehicle.

8. A system according to claim 7, wherein said target vehicle is generally cylindrical in shape and said additional markers are placed at the periphery of said target vehicle.

* * * * *